(12) United States Patent
Rivolta et al.

(10) Patent No.: US 11,719,718 B2
(45) Date of Patent: *Aug. 8, 2023

(54) SYSTEM AND METHOD FOR DETERMINING WHETHER AN ELECTRONIC DEVICE IS LOCATED ON A STATIONARY OR STABLE SURFACE

(71) Applicant: STMicroelectronics S.r.l., Agrate Brianza (IT)

(72) Inventors: Stefano Paolo Rivolta, Desio (IT); Federico Rizzardini, Settimo Milanese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 14 days.

This patent is subject to a terminal disclaimer.

(21) Appl. No.: 17/375,297

(22) Filed: Jul. 14, 2021

(65) Prior Publication Data

US 2021/0341512 A1 Nov. 4, 2021

Related U.S. Application Data

(63) Continuation of application No. 16/175,328, filed on Oct. 30, 2018, now Pat. No. 11,099,208.

(51) Int. Cl.
*G01P 15/18* (2013.01)
*G06N 20/00* (2019.01)
*G01P 15/14* (2013.01)

(52) U.S. Cl.
CPC .............. *G01P 15/18* (2013.01); *G01P 15/14* (2013.01); *G06N 20/00* (2019.01)

(58) Field of Classification Search
None
See application file for complete search history.

(56) References Cited

U.S. PATENT DOCUMENTS

| 11,099,208 | B2* | 8/2021 | Rivolta ................ G01P 15/18 |
| 2011/0172951 | A1 | 7/2011 | Schlumbohm |
| 2015/0316383 | A1 | 11/2015 | Donikian |
| 2016/0188853 | A1 | 6/2016 | Smith et al. |

(Continued)

FOREIGN PATENT DOCUMENTS

| CN | 102159920 A | 8/2011 |
| CN | 105009027 A | 10/2015 |

(Continued)

OTHER PUBLICATIONS

Groves, Paul D., "Principles of GNSS, Intertial, and Multisensor Integrated Navigation Systems," Second Edition, GNSS Technology and Applications Series, Chapter 6, IEEE Aerospace and Electronic Systems Magazine, 2015, 5 pages.

(Continued)

*Primary Examiner* — Roy Y Yi
(74) *Attorney, Agent, or Firm* — Slater Matsil, LLP (57) ABSTRACT

An embodiment system includes: a first motion sensor configured to generate first sensor data indicative of a first type of movement of an electronic device; a first feature detection circuit configured to determine at least one orientation-independent feature based on the first sensor data; and a classifying circuit configured to determine whether or not the electronic device is located on a stationary surface based on the at least one orientation-independent feature.

21 Claims, 10 Drawing Sheets

(56) References Cited

U.S. PATENT DOCUMENTS

2017/0168595 A1 6/2017 Sakaguchi et al.
2017/0231598 A1 8/2017 Baek et al.
2020/0132717 A1 4/2020 Rivolta et al.

FOREIGN PATENT DOCUMENTS

CN 106681478 A 5/2017
CN 210721520 U 6/2020

OTHER PUBLICATIONS

IEEE Symposium Series on Computational Intelligence, "Comparison of GPS and MEMS Support for Smartphone-Based Driver Behavior Monitoring", 2015, 8 pages.
Ramanandan Arvind, et al., "Detection of Stationarity in an Inertial Navigation System," 23rd International Technical Meeting of the Satellite Division of the Institute of Navigation, Sep. 21-24, 2010.
Simon Konge Koldb, et al., "Improving MEMS Gyroscope Performance using Homogeneous Sensor Fusion," Master's Thesis, May 2011, 5 pages.
Zhongtang, Zhao "Study on behavior identification method based on intelligent mobile terminal" Electronic Science and Technology University Press, 2015, Chapters 2 and 7, 5 pages.

\* cited by examiner

SYSTEM AND METHOD FOR DETERMINING WHETHER AN ELECTRONIC DEVICE IS LOCATED ON A STATIONARY OR STABLE SURFACE

CROSS-REFERENCE TO RELATED APPLICATIONS

This application is a continuation application of U.S. application Ser. No. 16/175,328, filed on Oct. 30, 2018, which application is hereby incorporated herein by reference.

TECHNICAL FIELD

The present disclosure relates generally to electronic devices, and, in particular embodiments, to a system and method for determining whether an electronic device is located on a stationary or stable surface.

BACKGROUND

As electronic devices become more ubiquitous and as individuals become more mobile, there is an increasing need to provide computing capabilities and information on the go. Such a need can be met, at least in part, by laptop computers, tablet devices, and wearable electronics (hereinafter individually and collectively referred to as an "electronic device").

One aspect that users often encounter with the use of an electronic device is high power consumption and/or poor heat dissipation, which often manifests as heating of the electronic device. Power supply components of the electronic device may be located on a bottom surface of the electronic device (e.g., the surface below the keyboard portion of a laptop computer). During long periods of use or during intense use (e.g. during gaming), the base of the electronic device can overheat, burn, or cause discomfort to the user if the electronic device is in physical contact with the user (e.g., the user's lap of wrist).

In addition to the potential of causing harm to human skin, elevated temperatures in the electronic device can detrimentally affect batteries that power the electronic device. While batteries can operate over a wide range of temperatures, charging or discharging the batteries while the electronic device is at an elevated temperature can reduce charge acceptance and reduce battery-life. For example, charging or discharging lithium polymer (LiPo) batteries at elevated temperatures can lead to gas generation that might cause a cylindrical cell to vent and a pouch cell to swell. Even further, elevated temperatures can detrimentally affect the lifetime of integrated circuits (e.g. provided on a printed circuit board (PCB) or implemented as silicon-on-chip (SoC)) in the electronic device, especially when such integrated circuits are subjected to prolonged durations of high operating temperatures.

In the past, heat sinks, fans, or holes could be used to funnel heat out of a body of the electronic device. However, as more functionality is added onto a PCB or into a SoC, heat is becoming a much more important consideration at the silicon level. Efficient ways of detecting whether or not the electronic device is located on a stationary or stable surface (e.g. a table or in a drawer) may be needed to optimize power consumption and/or heat dissipation of components within the electronic device.

SUMMARY

In an embodiment, a system includes: a first motion sensor configured to generate first sensor data indicative of a first type of movement of an electronic device; a first feature detection circuit configured to determine at least one orientation-independent feature based on the first sensor data; and a classifying circuit configured to determine whether or not the electronic device is located on a stationary surface based on the at least one orientation-independent feature.

In an embodiment, a method includes: generating, by an accelerometer of an electronic device, first sensor data over an acquisition time window; generating, by a gyroscope of the electronic device, second sensor data over the acquisition time window; determining, by a first feature detection circuit, at least one first orientation-independent feature for the acquisition time window based on the first sensor data; determining, by a second feature detection circuit, at least one second orientation-independent feature for the acquisition time window based on the second sensor data; and executing, by a classification circuit, a machine learning classification to determine whether or not the electronic device is located on a stationary surface based on the at least one first orientation-independent feature and the at least one second orientation-independent feature.

In an embodiment, an electronic device includes a detection system. The detection system includes: an accelerometer configured to generate accelerometer data indicative of a first type of movement of an electronic device; a first feature detection circuit coupled to an output of the accelerometer and configured to determine at least one orientation-independent feature based on the accelerometer data; and a classifying circuit configured to determine whether or not the electronic device is located on a stationary surface based on the at least one orientation-independent feature.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Various embodiments described herein are directed to efficient systems and methods for determining whether or not an electronic device is located on a stationary or stable surface (e.g. on a stationary or stable inanimate surface such as on a table or in a drawer). Such a determination may be used, for example, to optimize device performance, vary power consumption of the electronic device, and/or manage heat dissipation of components within the electronic device. As an illustration, in various embodiments, in response to a determination that the electronic device is on a stationary or stable surface (e.g. a table), fan speeds and clock frequencies of electronic components (e.g. of a central processing unit (CPU), a graphics processing unit (GPU), or a power supply unit) in the electronic device may be increased to achieve better performance (e.g. faster computation times); however, in response to a determination that the electronic device is not on a stationary or stable surface (e.g. when the electronic device is in motion or on a user's lap), clock frequencies of components in the electronic device may be decreased to reduce power consumption and to avoid overheating of the components in the electronic device.

At the outset, it is noted that the embodiments described below are directed to systems and methods of determining whether or not the electronic device is located on a stationary or stable surface. Use of the result of such a determination in the electronic device is given merely as illustrations, examples being to implement thermal policies, power savings, and performance benchmarks. The use of the result of such a determination in controlling or varying an operation of the electronic device may, in general, be left to the discretion of the manufacturer(s) of the electronic device and/or the manufacturer(s) of the electronic components of the electronic device.

As described below, the proposed methods use data from one or more motion sensors included in the electronic device. While conventional systems and methods of determining whether or not the electronic device is located on a stationary or stable surface may use data from one or more motion sensors, such conventional systems and methods may suffer from several disadvantages. For example, the motion sensors of the electronic device generate motion sensor data, and conventional systems and methods extract features from the motion sensor data that depend on an orientation of the motion sensor in the electronic device relative to a plurality of reference axes in order to determine whether or not the electronic device is located on a stationary or stable surface. In other words, conventional systems and methods rely on orientation-dependent features for the determination. Illustratively, conventional systems and methods may extract, from the motion sensor data, pitch, yaw, roll and/or various acceleration components relative to a calibrated coordinate system or the plurality of reference axes (e.g. three-dimensional coordinate system or a 6-axes system), with such orientation-dependent features being subsequently used to determine whether or not the electronic device is located on a stationary or stable surface.

Use of such orientation-dependent features requires calibration of the motion sensors of the electronic device to reduce sensor offset and bias (e.g. accelerometer offset and/or gyroscope bias). Calibration is also needed to generate the calibrated coordinate system or the plurality of reference axes, with such calibration ensuring that the orientation-dependent features (e.g., pitch, yaw, roll, x-axis acceleration component, y-axis acceleration component, and/or z-axis acceleration component) accurately track the motion and/or orientation of the electronic device. As a result of the use of orientation-dependent features, conventional systems and methods are not easily reconfigurable or re-tunable, can suffer from high latency and long convergence times (e.g. 10 seconds or more), and have limited accuracy since such conventional systems and methods are susceptible to device-to-device variations and orientation-based variations. Embodiment systems and methods aim to circumvent at least these disadvantages associated with conventional methods of determining whether or not the electronic device is located on a stationary or stable surface.

In general, embodiment systems and methods described herein extract a few (e.g. one or two) significant features from motion sensor data, and such extracted features are orientation-independent. Stated differently, the features extracted from motion sensor data are not dependent on a calibrated coordinate system or a plurality of reference axes for accuracy. In particular, embodiment systems and methods rely on a mean-cross value (explained in greater detail below) and a variance of the norm of the motion sensor data within each acquisition time window, which features are orientation-independent. Furthermore, embodiment systems and methods analyze the mean-cross value and the variance of the norm using a machine learning approach to determine whether or not the electronic device is located on a stationary or stable surface. Additionally, embodiment systems and methods use physical sensor data without the need of complex processing methods (examples of such methods being sensor fusion for attitude estimation, calibration, FFT, and complex filtering chains). Due to the use of orientation-independent features, a machine learning approach, and physical sensor data, the embodiment systems and methods have at least the following advantages: (1) are easily tuned or reconfigured; (2) have low latency and short convergence times (e.g. less than 10 seconds); (3) do not require calibration of the motion sensors (thereby exhibiting immunity against device-to-device variations, accelerometer offsets, and/or gyroscope bias); and (4) have greater reliability compared to conventional systems and methods since orientation-independent features are used instead of orientation-dependent features.

Figure 1:
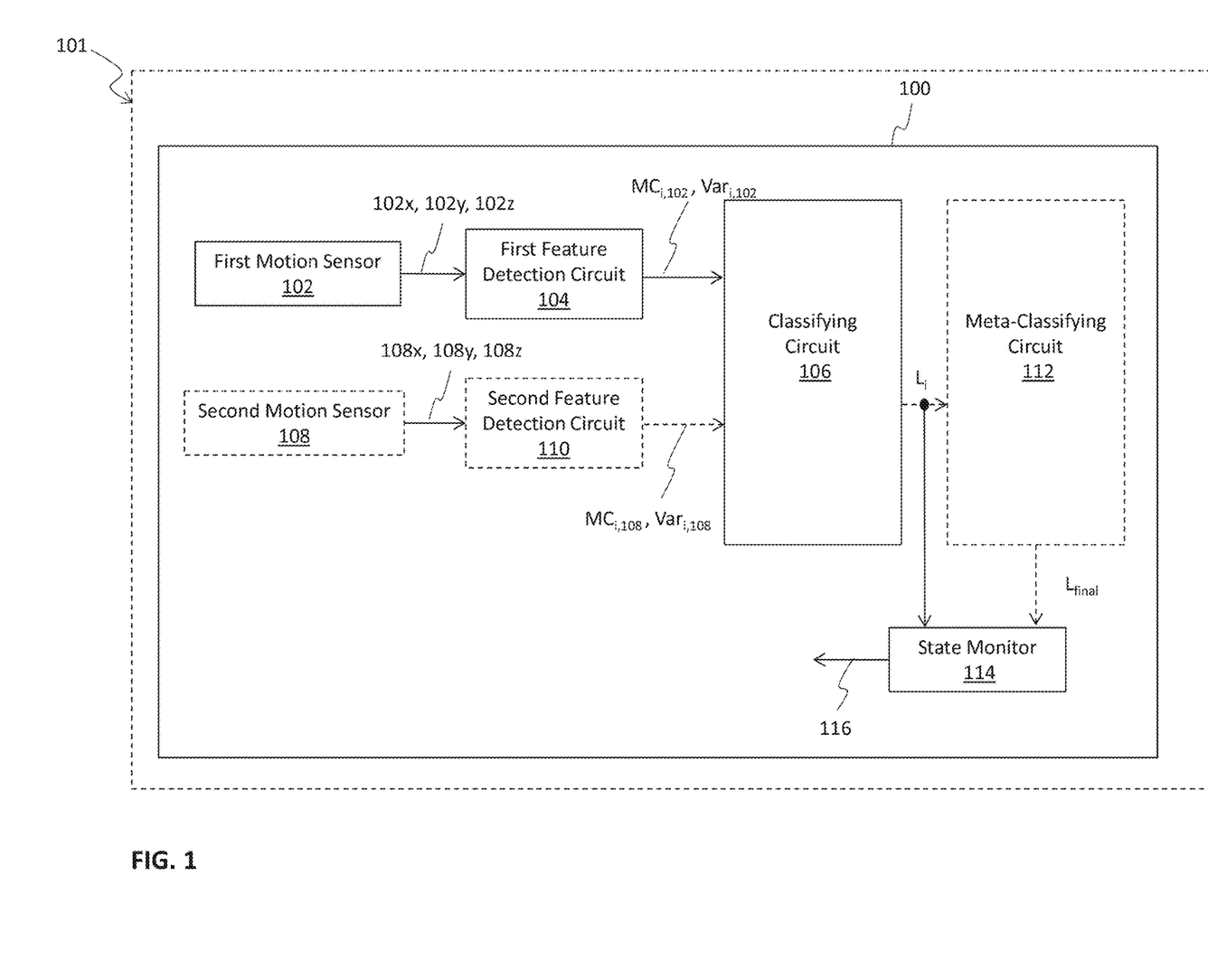
FIG. 1 shows a block diagram of an electronic device including a detection system, in accordance with an embodiment.

FIG. 1 shows a block diagram of an electronic device 101 including a detection system 100, in accordance with an embodiment. The detection system 100 may be within, attached, or coupled to the electronic device 101. The detection system 100 of the electronic device 101 may be used to determine whether or not the electronic device 101 is on a stationary or stable surface (e.g. on a table or in a drawer). As mentioned above, the electronic device 101 may be a laptop computer, a tablet device, or a wearable electronic device (e.g. a smart watch, mobile phone, wireless headphones, or the like). The detection system 100 includes a first motion sensor 102 and a first feature detection circuit 104 that is coupled to an output of the first motion sensor 102. The first feature detection circuit 104 is configured to determine one or more orientation-independent features from the output signal of the first motion sensor 102.

As shown in FIG. 1, a classifying circuit 106 is coupled to an output of the first feature detection circuit 104. The classifying circuit 106 is configured to determine a state of the electronic device 101 (e.g. assign a label indicating whether or not the electronic device 101 is located on a stationary or stable surface). Such a determination by the classifying circuit 106 is based on the orientation-independent features determined by the first feature detection circuit 104.

In some embodiments, the detection system 100 may further include a second motion sensor 108 that measures a different motion characteristic compared to the first motion sensor 102. In such embodiments, a second feature detection circuit 110 may be coupled to an output of the second motion sensor 108. Similar to the first feature detection circuit 104, the second feature detection circuit 110 is configured to determine one or more orientation-independent features from the output signal of the second motion sensor 108.

In embodiments including the second motion sensor 108, the classifying circuit 106 is configured to determine a state of the electronic device 101 (e.g. assign a label indicating whether or not the electronic device 101 is located on a stationary or stable surface), with such determination being based on the orientation-independent features determined by the first feature detection circuit 104 and the orientation-independent features determined by the second feature detection circuit 110.

In some embodiments, the detection system 100 may further include a meta-classifying circuit 112 coupled to an output of the classifying circuit 106. The meta-classifying circuit 112 may implement a time-based voting method that acts as a low-pass filter on the output of the classifying circuit 106 in order to improve an overall accuracy of the detection system 100. Each of the components of the detection system 100 is described in further detail below.

The detection system 100 includes the first motion sensor 102, which may be an accelerometer of the electronic device 101. It is noted that although only one first motion sensor 102 is shown in FIG. 1, a plurality of first motion sensors 102 may be included in the electronic device 101 (e.g. two or more accelerometers placed at different locations of the electronic device 101). The electronic device 101 having the first motion sensor 102 may be a laptop computer having an accelerometer coupled or attached to a base of the laptop computer. As another example, the electronic device 101 having the first motion sensor 102 may be a tablet having an accelerometer included within the tablet. The first motion sensor 102 may be configured to sense vibration or acceleration of the electronic device 101 in each axis of motion. For example, the first motion sensor 102 may generate first sensor data $102x$, $102y$, $102z$ that is indicative of vibration or acceleration of the electronic device 101 in the lateral axis (e.g. referred to as the "x axis"), longitudinal axis (e.g. referred to as the "y axis"), and vertical or normal axis (e.g. referred to as the "z axis"), respectively.

As will be clear in the description below, use of the first sensor data $102x$, $102y$, $102z$ from the first motion sensor 102 enables the embodiment system and methods to determine whether or not the electronic device 101 is located on a stationary or stable surface. However, in other embodiments, detection can be improved with the use of the second motion sensor 108 in conjunction with the first motion sensor 102. The second motion sensor 108 may be a gyroscope of the electronic device 101. It is reiterated that use of the second motion sensor 108 (and consequently, the data generated by the second motion sensor 108) is optional. For example, in low-power or low-cost implementations of the embodiment systems and methods, the second motion sensor 108 (e.g. gyroscope) and the data therefrom may not be present or used by the classifying circuit 106 to determine whether or not the electronic device 101 is located on a stationary or stable surface (e.g. on a table or in a drawer). The second motion sensor 108 may be configured to measure a rate at which the electronic device 101 rotates around each axis of motion. For example, the second motion sensor 108 may generate second sensor data $108x$, $108y$, $108z$ that is indicative of the rotation rate of the electronic device 101 around the x-axis, the y-axis, and the z-axis, respectively.

It is noted that the first sensor data $102x$, $102y$, $102z$ and the second sensor data $108x$, $108y$, $108z$ respectively generated by the first motion sensor 102 and the second motion sensor 108 may depend, at least in part, on a placement or orientation of the electronic device 101. As an illustration, the electronic device 101 may be placed in an inclined plane, a flat plane, on a part of the human body (e.g. a lap), or on an inanimate object (e.g. a desk). The first sensor data $102x$, $102y$, $102z$ and the second sensor data $108x$, $108y$, $108z$ may be indicative of such a placement or orientation of the electronic device 101. Furthermore, while the first feature detection circuit 104 and the second feature detection circuit 110 are shown as separate circuits in FIG. 1, it is noted that in some embodiments, a single detection circuit may implement both the first feature detection circuit 104 and the second feature detection circuit 110.

Figure 2:
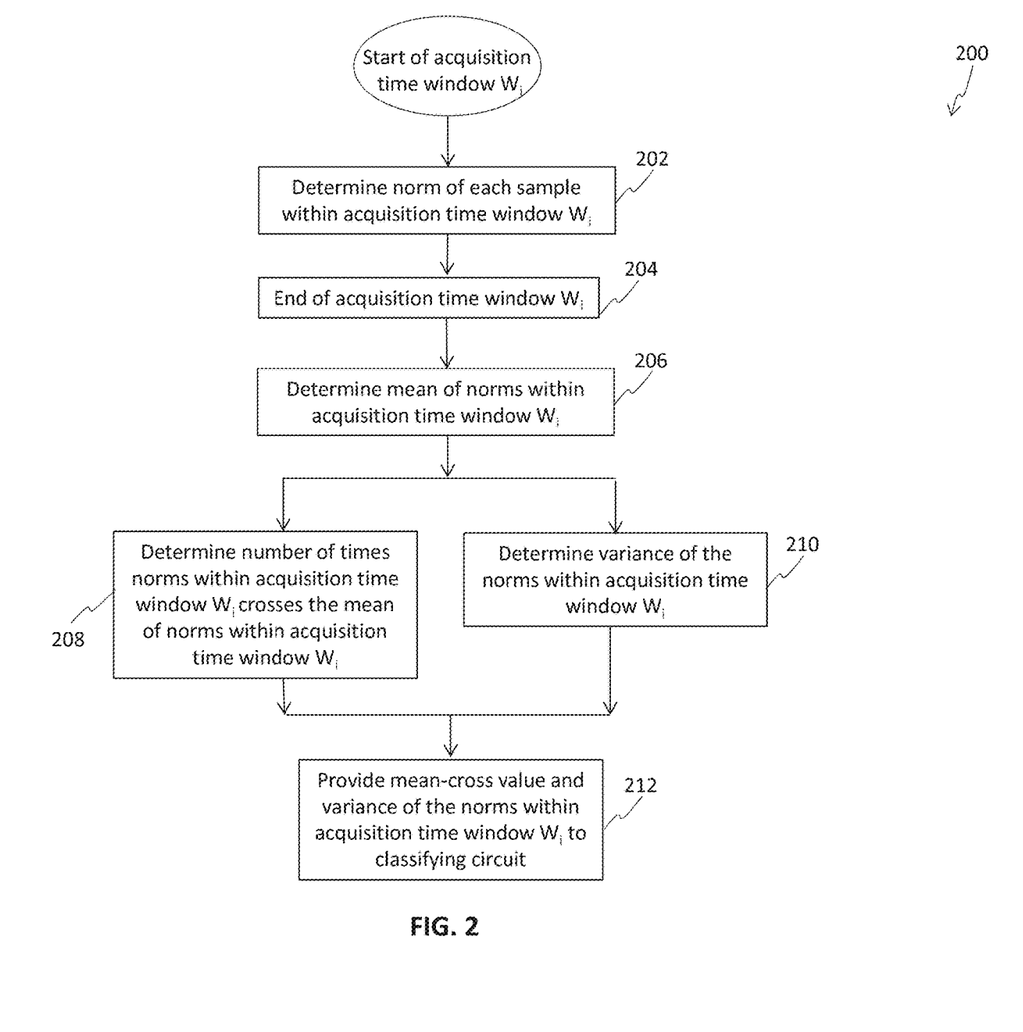
FIG. 2 shows a method of extracting orientation-independent features from sensor data generated by a motion sensor of the electronic device of FIG. 1, in accordance with an embodiment.

FIG. 2 shows an embodiment method 200 that may be executed by the first feature detection circuit 104 to extract or determine orientation-independent features from the first sensor data $102x$, $102y$, $102z$. The method 200 may also be executed by the second feature detection circuit 110 to extract or determine orientation-independent features from the second sensor data $108x$, $108y$, $108z$, in other embodiments that optionally utilize the second motion sensor 108 (e.g. gyroscope) in addition to the first motion sensor 102 (e.g. accelerometer). The description that follows is directed to examples where the first feature detection circuit 104 executes the method 200; however, such description applies equally to the second feature detection circuit 110 in other embodiments that optionally utilize the second motion sensor 108 in addition to the first motion sensor 102.

Figure 3A:
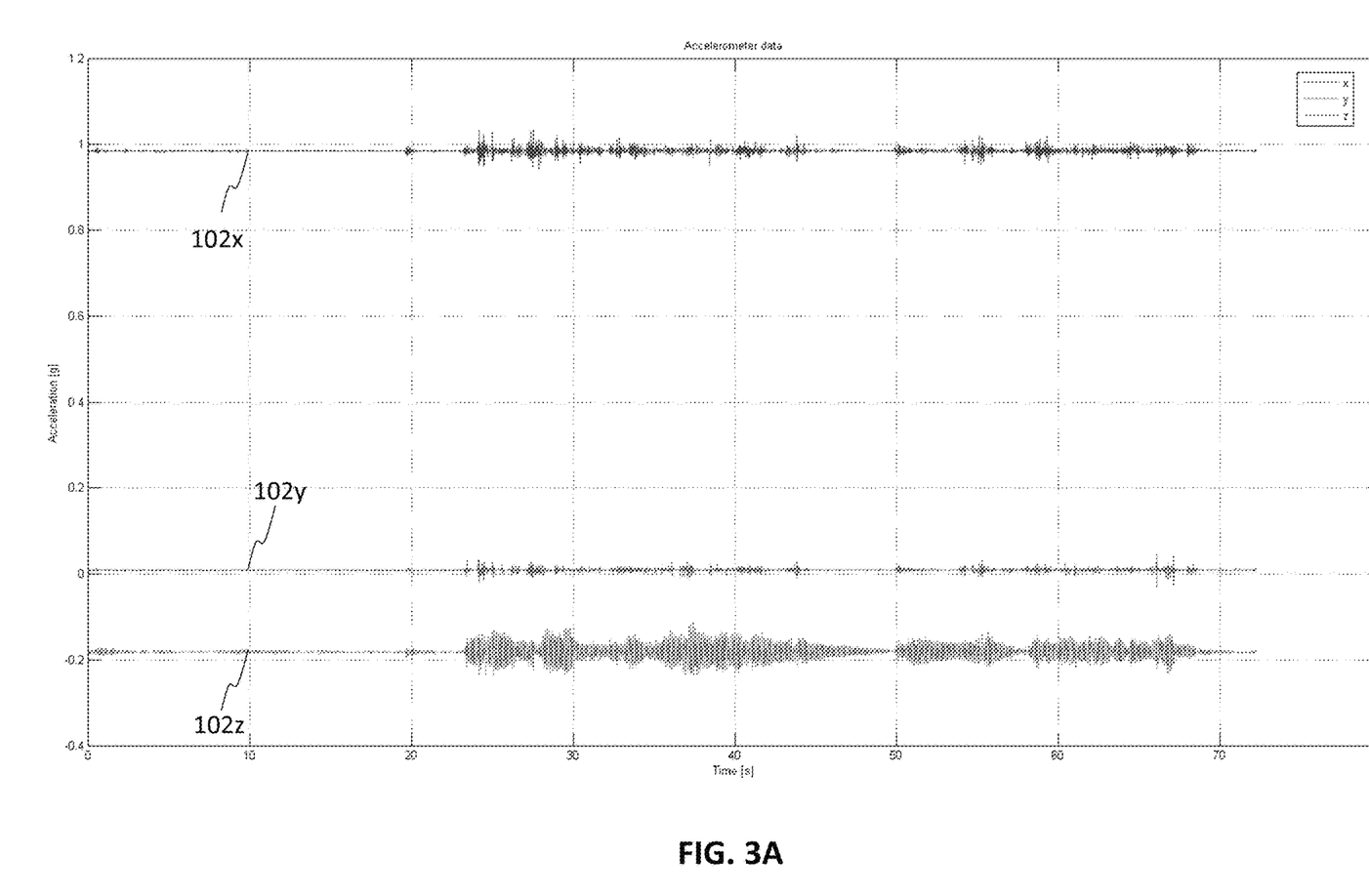
FIG. 3A shows sensor data generated by a motion sensor of the electronic device of FIG. 1, in accordance with an embodiment.
Figure 3B:
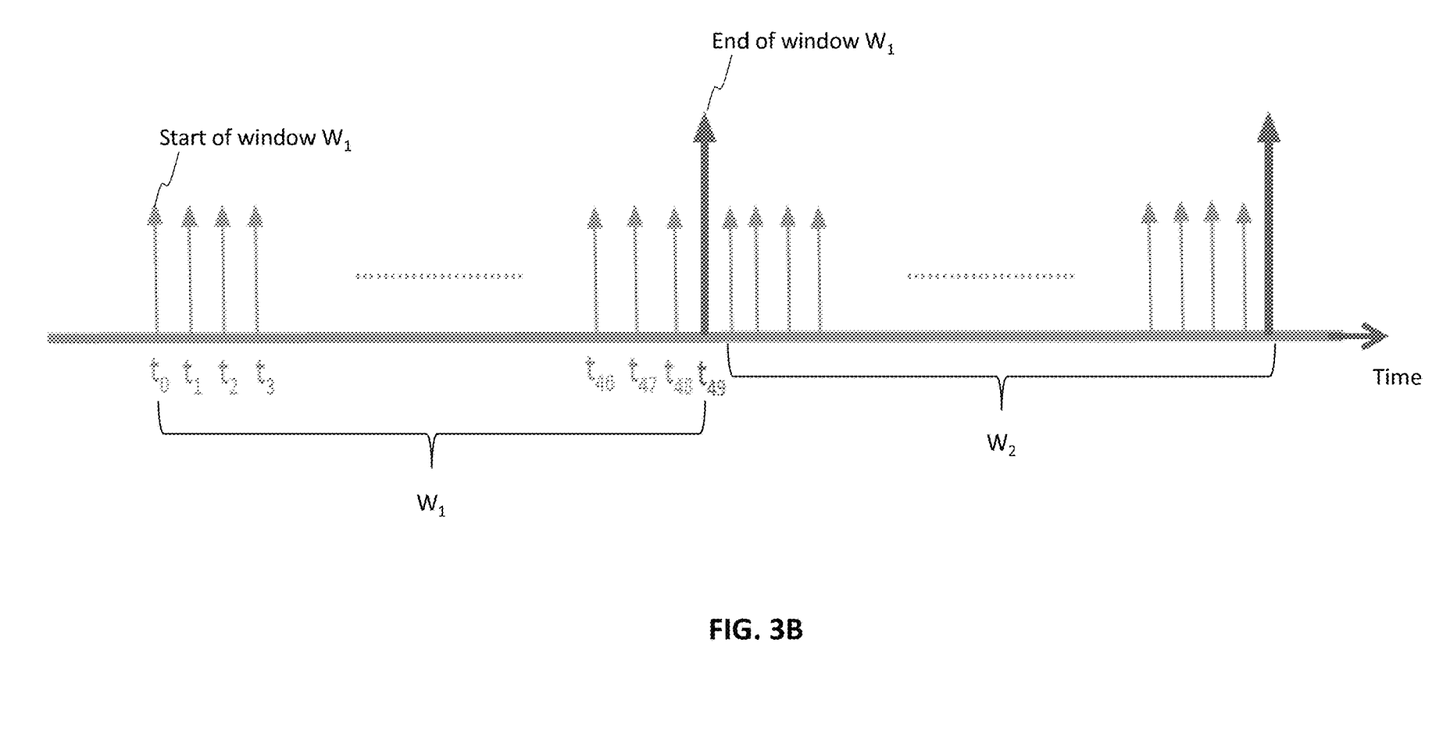
FIG. 3B shows a zoomed-in view of sampling times of first and second acquisition time windows of the sensor data of FIG. 3A, in accordance with an embodiment.
Figure 3C:
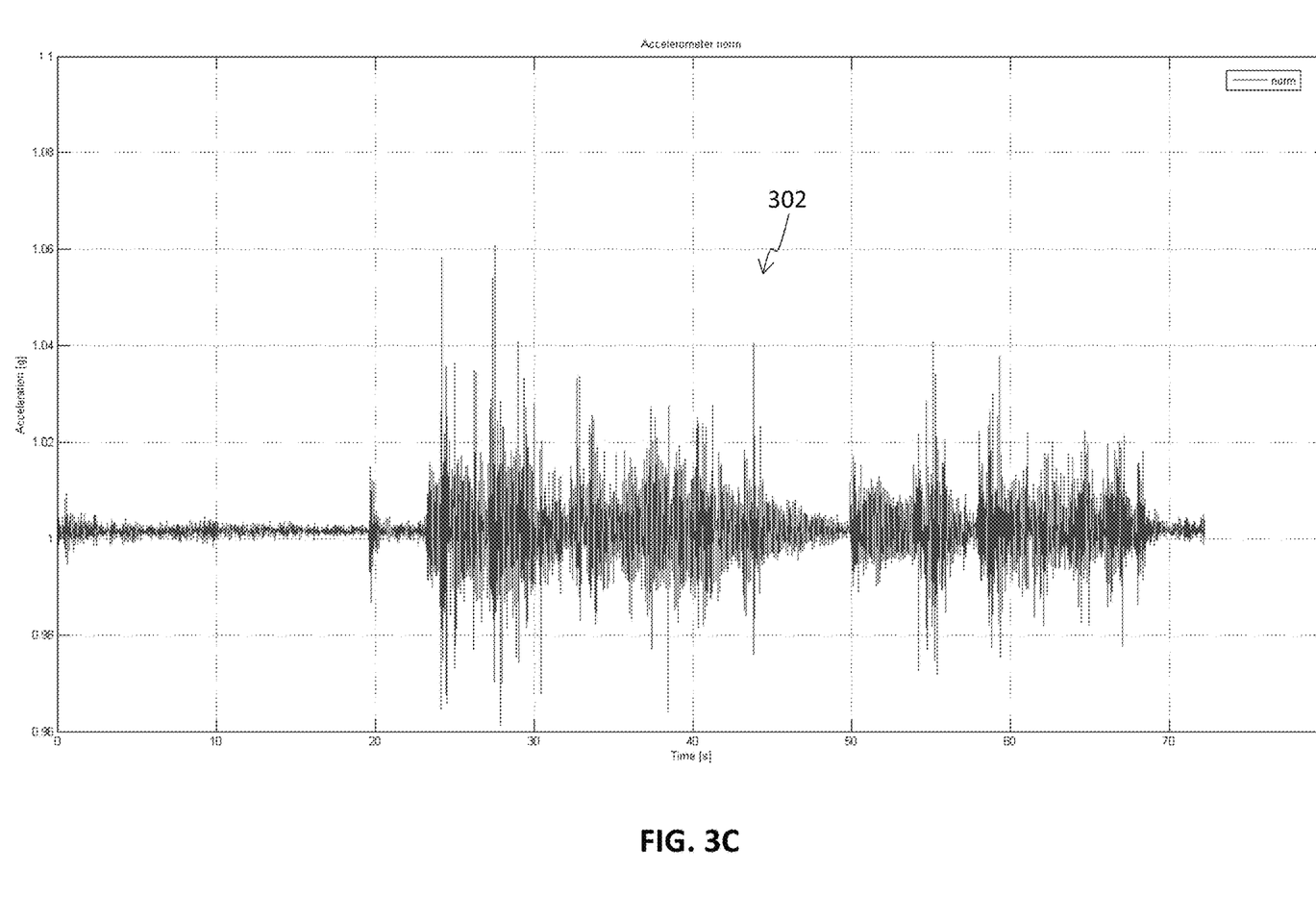
FIG. 3C shows the norm of the sensor data of FIG. 3A, in accordance with an embodiment.

Prior to discussing the details of method 200 in FIG. 2, a brief discussion of acquisition time windows is provided with reference to FIGS. 3A and 3B. FIG. 3A shows an example of the first sensor data $102x$, $102y$, $102z$ that is generated by the first motion sensor 102 over a plurality of acquisition time windows. FIG. 3B shows a zoomed-in view of sampling times of the first two acquisition time windows $W_1$, $W_2$ of the example of FIG. 3A. As illustrated in FIG. 3B, the plurality of acquisition time windows are consecutive and non-overlapping windows of time in some embodiments. However, in other embodiments, overlapping windows of time are also possible. In the example of FIG. 3B, the first acquisition time window W1 starts at time $t_o$ and ends at time $t_{49}$. In an embodiment, such as in the examples of FIGS. 3A and 3B, each acquisition time window has a duration of 1 second and includes 50 samples (e.g. corresponding to a 50 Hz sampling frequency). Consequently, in the example of FIG. 3A, there are about 72 acquisition time windows and a total about 3600 samples (i.e., 50 samples for each of the 72 acquisition time windows). It is noted that each sample includes a complete dataset (e.g. x-axis data, y-axis data, and z-axis data). It is also noted that the 50 Hz sampling frequency and the 1 second duration for each acquisition time window are merely examples, and other embodiments are envisioned where different sampling frequencies and different time durations are used. FIG. 3C shows the norm 302 of the first sensor data 102x, 102y, 102z in FIG. 3A, and the norm 302 at a given sample time may be indicative of the magnitude of the first sensor data 102x, 102y, 102z at the given sample time.

The method 200 is executed for each acquisition time window $W_i$. As shown in FIG. 2, method 200 is triggered at the start of acquisition time window $W_i$ (e.g. time $t_o$ in FIG. 3B) and includes step 202, where the first feature detection circuit 104 receives the first sensor data 102x, 102y, 102z and determines the norm of each sample within the acquisition time window $W_i$. In some embodiments, the norm of each sample within the acquisition time window $W_i$ is stored in a buffer included in the first detection circuit 104, although in other embodiments, the computation technique used to determine the norm may obviate the need for such a buffer.

In step 204, the acquisition time window $W_i$ ends and the method 200 proceeds to step 206 where the mean of the norms within the acquisition time window $W_i$ are determined. In steps 208 and 210, statistical data is extracted from the norms within the acquisition time window $W_i$. Consequently, steps 206, 208 and 210 are triggered each time an entire window of samples is acquired (e.g. each time 50 samples are acquired in a 1 second time window). The statistical data includes the mean-cross value within the acquisition time window $W_i$ (in step 208) and the variance of the norms within the acquisition time window $W_i$ (in step 210), both of which require the mean of the norms determined in step 206.

Figure 3D:
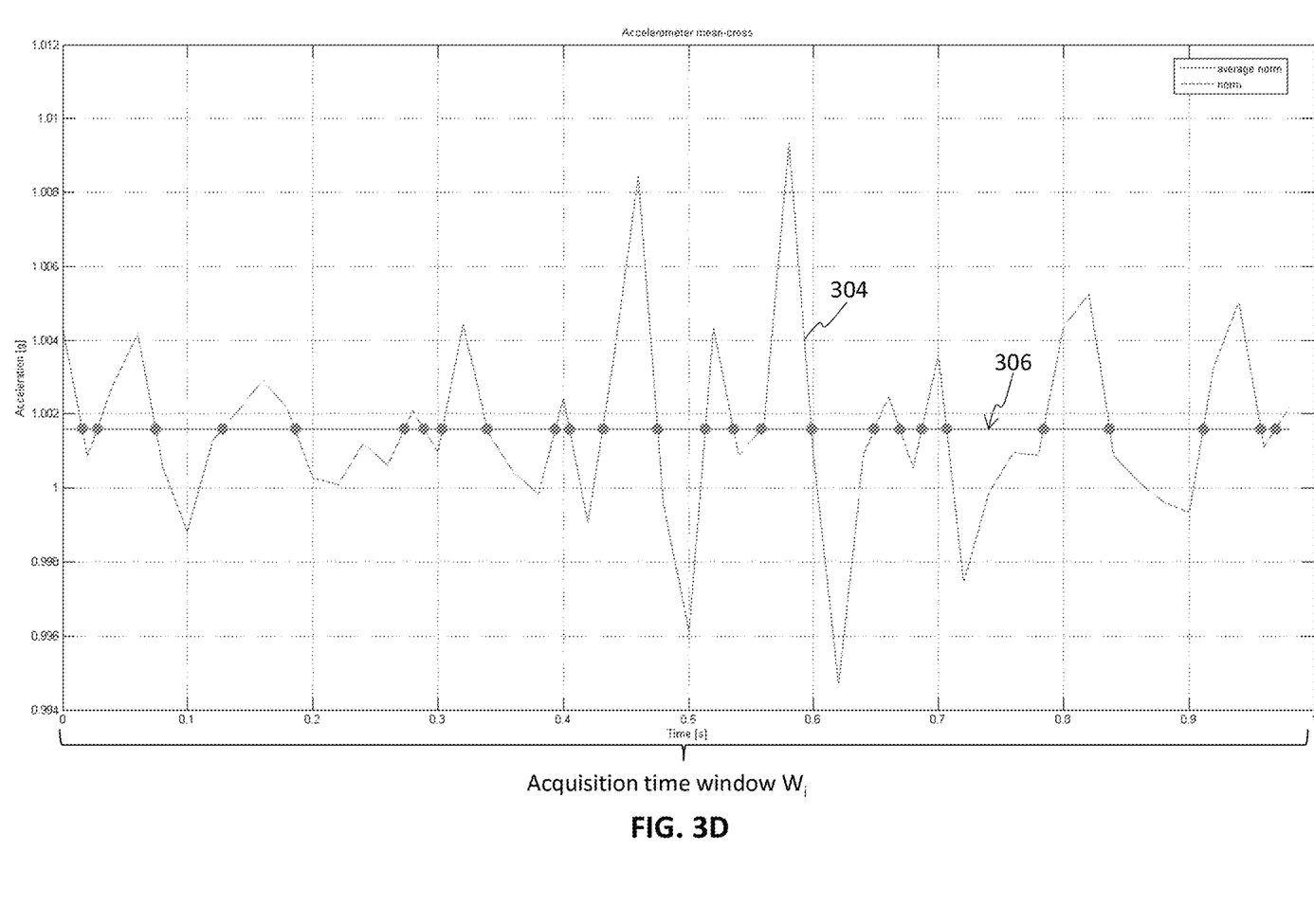
FIG. 3D shows the norm of the sensor data of FIG. 3A within the first acquisition time window of the sensor data of FIG. 3A, in accordance with an embodiment.

With reference to step 208, the mean-cross value denotes the number of times the norms within the acquisition time window $W_i$ crosses the mean of the norms within the acquisition time window $W_i$. An illustration is given in FIG. 3D, which shows the norms 304 within the acquisition time window $W_i$ (e.g. determined in step 202) and the mean 306 of the norms within the acquisition time window $W_i$ (e.g. determined in step 206). In the example of FIG. 3D, there are 26 times when the norms 304 within the acquisition time window $W_i$ crosses the mean 306 of the norms within the acquisition time window $W_i$. These instances are depicted as points of intersection of the curve 304 and the line 306. Consequently, the mean-cross value for the example of FIG. 3D is 26.

With reference to step 210, the variance of the norm within the acquisition time window $W_i$ is determined as follows:

$$\text{variance} = \frac{\sum_{1}^{n}(x_i - x_{mean})^2}{n-1}$$

where n is the number of samples within the acquisition time window $W_i$ (e.g. 50 in the case of a 50 Hz sampling frequency), $x_i$ is the $i^{th}$ norm 304 within the acquisition time window $W_i$, and $x_{mean}$ is the mean of the norms 306 within the acquisition time window $W_i$.

At step 212 of method 200, the mean-cross value and the variance of the norms within the acquisition time window $W_i$ is provided to the classifying circuit 106. As such, the classifying circuit 106 is run after the acquisition time window $W_i$ ends and after the mean-cross value and the variance of the norms within the acquisition time window $W_i$ are determined by the appropriate detection circuit. It is once again noted that the mean-cross value and the variance of the norms within the acquisition time window $W_i$ are the orientation-independent features that are used to determine whether or not the electronic device 101 is located on a stationary or stable surface.

Figure 4A:
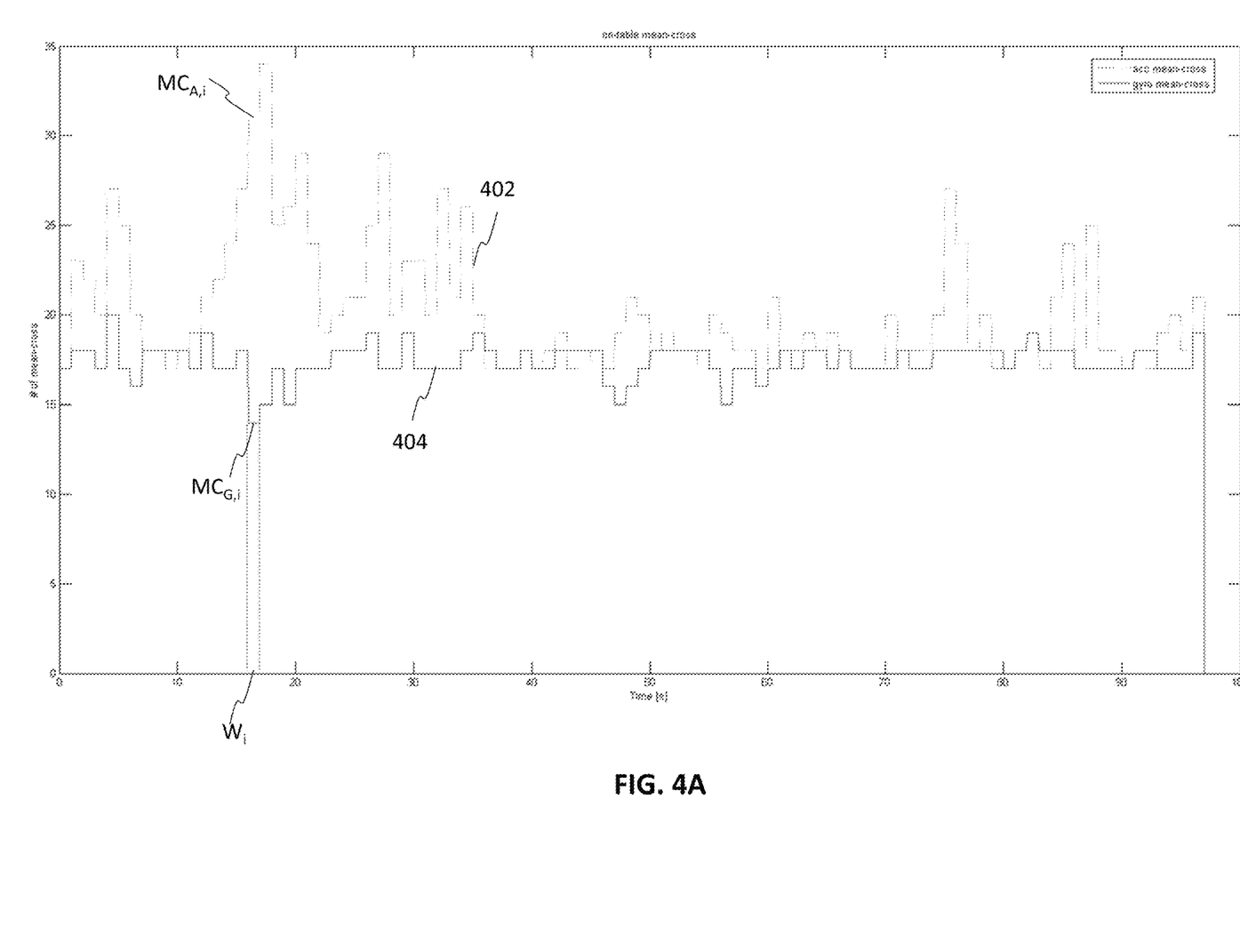
FIGS. 4A and 4B show mean-cross values generated by different motion sensors of the electronic device of FIG. 1 for different states, in accordance with an embodiment.
Figure 4B:
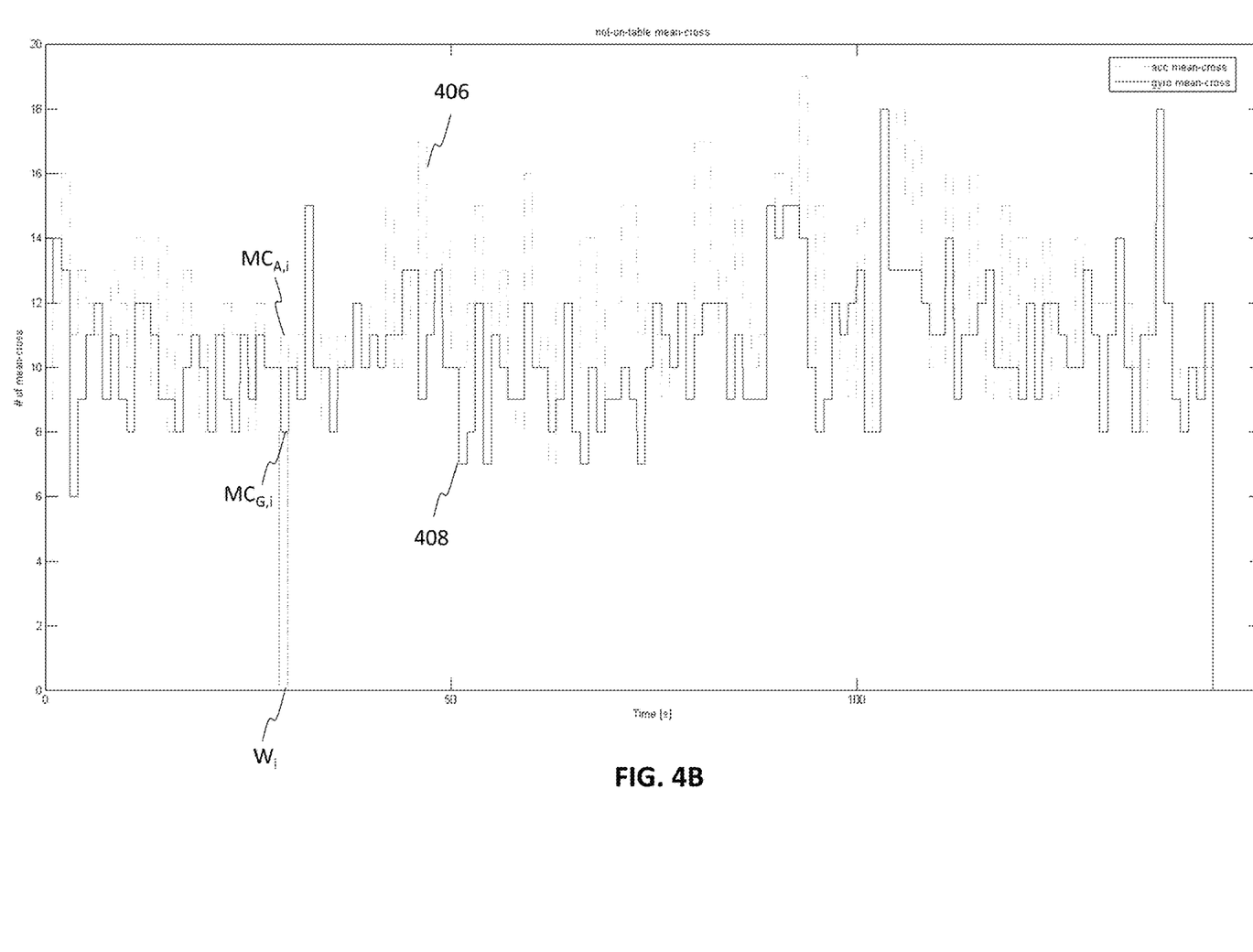

FIG. 4A shows mean-cross values 402 generated by the first feature detection circuit 104 and mean-cross values 404 generated by the second feature detection circuit 110 over 96 acquisition time windows $W_i$ in a scenario where the electronic device 101 is located on a stationary or stable surface (e.g. a table). Consequently, each acquisition time windows $W_i$ in FIG. 4A has a respective mean-cross value $MC_{A,i}$ associated with the first motion sensor 102 (e.g. accelerometer) and a respective mean-cross value $MC_{G,i}$ associated with the second motion sensor 108 (e.g. gyroscope). FIG. 4B shows mean-cross values 406 generated by the first feature detection circuit 104 and mean-cross values 408 generated by the second feature detection circuit 110 over 145 acquisition time windows $W_i$ in a scenario where the electronic device 101 is not located on a stationary or stable surface (e.g. when on a human lap). Consequently, each time window $t_i$ in the example of FIG. 4B has a respective mean-cross value $MC_{A,i}$ associated with the first motion sensor 102 (e.g. accelerometer) and a respective mean-cross value $MC_{G,i}$ associated with the second motion sensor 108 (e.g. gyroscope).

Figure 5A:
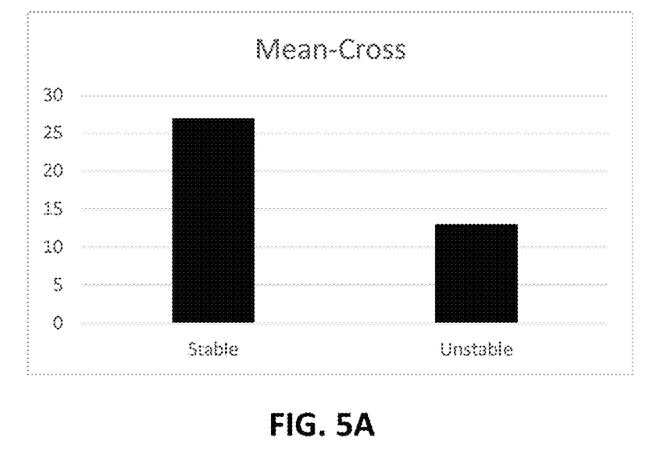
FIGS. 5A and 5B show relative differences between mean-cross values and variances for different states, in accordance with an embodiment.

As can be observed by comparing the mean-cross values 402 and 406 of FIGS. 4A and 4B, respectively, it has been observed through experiments that the mean-cross values 402 obtained by method 200 when the electronic device 101 is located on a stationary or stable surface (e.g. when on a table) is expected to be greater than the mean-cross values 406 obtained by method 200 when the electronic device 101 is not located on a stationary or stable surface (e.g. when on a human lap). This relative difference in the mean-cross values in the two different states is depicted in FIG. 5A and can be explained in terms of the contribution of white noise of the first motion sensor 102 to the first sensor data 102x, 102y, 102z in the two states, namely: (1) when the electronic device 101 is located on a stationary or stable surface, and (2) when the electronic device 101 is not located on a stationary or stable surface.

For example, the first sensor data 102x, 102y, 102z from the first motion sensor 102 can be approximated as white noise of the first motion sensor 102 added with motion-dependent signals. The white noise of the first motion sensor 102 can be approximated as a signal that causes the first sensor data 102x, 102y, 102z to fluctuate frequently and randomly around its mean value when the motion-dependent signals are stable and slowly varying (e.g. when on a stationary or stable surface). Comparatively, white noise of the first motion sensor 102 has less of a contribution on the first sensor data 102x, 102y, 102z when the motion-dependent signals are dominant (e.g. when not on a stationary or stable surface). As a result, the mean-cross values 402 when the electronic device 101 is located on a stationary or stable surface is expected to be greater than the mean-cross values 406 when the electronic device 101 is not located on a stationary or stable surface.

In a similar manner, it can be observed from FIGS. 4A and 4B that the mean-cross values 404 obtained by method 200 when the electronic device 101 is located on a stationary or stable surface (e.g. when on a table) is greater than the mean-cross values 408 obtained by method 200 when the electronic device 101 is not located on a stationary or stable surface (e.g. when on a human lap). This difference in the mean-cross values for the two difference states can also be explained in terms of the contribution of white noise of the second motion sensor 108 to the second sensor data 108x, 108y, 108z in the two states, as described above.

Figure 5B:
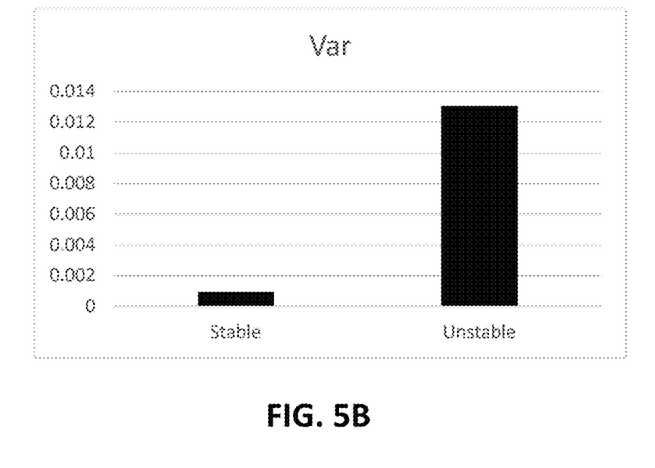

With regards to the variance of the norm, it has been observed through experiments that the variance of the norms when the electronic device 101 is located on a stationary or stable surface is expected to be smaller than the variance of the norms when the electronic device 101 is not located on a stationary or stable surface. This relative difference in the variance of the norms in the two different states is depicted in FIG. 5B.

Moving on to the classifying circuit 106, as noted above, the classifying circuit 106 is run after the acquisition time window $W_i$ ends and after it has received the mean-cross value and the variance of the norms for the acquisition time window $W_i$. The classifying circuit 106 may be configured to determine whether or not the electronic device 101 is located on a stationary or stable surface during the acquisition time window $W_i$ based on at least the mean-cross value and the variance of the norms for each acquisition time window $W_i$. The classifying circuit 106 may be a supervised machine learning classifier implemented using machine learning techniques, examples being logistic regression, naive Bayes classifier, support vector machines, decision trees, boosted trees, random forest, neural networks, nearest neighbor, among others. The classifying circuit 106 is configured to assign a label (or decision) $L_i$ to each acquisition time window $W_i$ with such label $L_i$ indicating whether or not the electronic device 101 is located on a stationary or stable surface during the acquisition time window $W_i$. The usage of the variance of the norm can increase the accuracy of the classifying circuit 106, with the variance of the norm decreasing if the electronic device 101 is located on a stationary or stable surface, and the variance of the norm increasing if the electronic device 101 is not located on a stationary or stable surface.

It is noted that supervised learning is a machine learning task of learning a function that maps an input to an output based on example input-output pairs. In particular, supervised learning infers a function from labeled training data including a set of training examples. In the supervised machine learning classifier of classifying circuit 106, labeled training data may be obtained by placing the electronic device 101 (including the first motion sensor 102 and, optionally, the second motion sensor 108) on a stationary or stable surface (e.g. a table) and logging the first sensor data 102x, 102y, 102z and the second sensor data 108x, 108y, 108z for various typing intensity levels and different orientations and positions of the electronic device 101 on the stationary or stable surface. The first sensor data 102x, 102y, 102z and the second sensor data 108x, 108y, 108z for these various typing intensity levels and different orientations and positions are known to have been obtained when the electronic device 101 is located on a stationary or stable surface. Consequently, such first sensor data 102x, 102y, 102z and second sensor data 108x, 108y, 108z are then subjected to the method 200 of FIG. 2 to obtain mean-cross values and variance of norms values for various acquisition time windows $W_i$, and such mean-cross values and variance of norms values are subsequently assigned the label indicating that the electronic device 101 is located on a stationary or stable surface.

Similarly, labeled training data may also be obtained by placing the electronic device 101 on a moving or unstable surface (e.g. a human lap) and logging the first sensor data 102x, 102y, 102z and the second sensor data 108x, 108y, 108z for various typing intensity levels and different orientations and positions of the electronic device 101 on the stationary or stable surface. The various first sensor data 102x, 102y, 102z and the various second sensor data 108x, 108y, 108z obtained in such a manner are then subjected to the method 200 of FIG. 2 to obtain mean-cross values and variance of norms values for various acquisition time windows $W_i$, and such mean-cross values and variance of norms values are subsequently assigned the label indicating that the electronic device 101 is not located on a stationary or stable surface.

Latency of the detection system 100 shown in FIG. 1 may depend on at least the latency of the classifying circuit 106, which may be equal the duration of each of the acquisition time windows $W_i$. In an embodiment where the duration of each acquisition time window $W_i$ is 1 second, the classifying circuit 106 has a latency of 1 second since a label $L_i$ is output from the classifying circuit 106 every second. As will be described below, in embodiments that also include the meta-classifying circuit 112, the latency of the detection system 100 is also affected by the meta-classifier output latency.

To further enhance the accuracy of the determination of whether or not the electronic device 101 is located on a stationary or stable surface, the detection system 100 may include the meta-classifying circuit 112. In an embodiment, the meta-classifying circuit 112 is configured to determine the number of consecutive occurrences of the output $L_i$ of the classifying circuit 106. If the number of consecutive occurrences overcomes a threshold, the output of the meta-classifying circuit 112 (labelled $L_{final}$ in FIG. 1) is changed. Otherwise, the previous state is kept. As such, the meta-classifying circuit 112 can be used to low-pass filter the output of the classifying circuit 106 (e.g. to avoid glitches and spurious false positives).

Use of the meta-classifying circuit 112 introduces latency to the detection system 100, and the latency of the meta-classifying circuit 112 can be configured to be a minimum of N times the duration of an acquisition time window $W_1$. In some embodiments, different minimum latencies may be applicable depending on whether the output of the classifying circuit 106 indicates that the electronic device 101 is located on a stationary or stable surface (e.g. where $N=N_{on\_table}$ and the output state $L_{final}$ is changed if the number of consecutive occurrences reaches $N_{on\_table}$) or whether the output of the classifying circuit 106 indicates that the electronic device 101 is not located on a station or stable surface (e.g. where $N=N_{not\_on\_table}$ and the output state $L_{final}$ is changed if the number of consecutive occurrences reaches $N_{not\_on\_table}$). In some embodiments, $N_{not\_on\_table}$ can be different from $N_{on\_table}$. The output of the meta-classifying circuit 112 is updated according to the meta-classifier logic configuration and the configured meta-classifier output latency. In some embodiments $N_{on\_table}$ may be configured to be between 2 and 10, while $N_{not\_on\_table}$ may be configured to be between 2 and 10.

While use of the meta-classifying circuit 112 may increase an accuracy of the determination of whether or not the electronic device 101 is located on a stationary or stable surface, this increase in accuracy comes at a cost of increased system latency. However, even though latency increases as accuracy increases, the embodiment systems and methods achieve latencies that are less than 10 seconds (e.g. between 4 seconds and 9 seconds), even with the use of the meta-classifying circuit 112.

As discussed above, in low-power or low-cost implementations of the embodiment systems and methods, the second motion sensor 108 (e.g. gyroscope) and the data therefrom may not be used by the classifying circuit 106 to determine whether or not the electronic device 101 is located on a stationary or stable surface (e.g. on a table or in a drawer). In experiments that have been run, it has been noted that approximately 90% accuracy can be achieved if the classifying circuit 106 only uses the mean-cross values $MC_{i,102}$ and the variance of the norms $Var_{i,102}$ obtained from the first sensor data 102$x$, 102$y$, 102$z$. In other words, labels $L_i$ are correctly given to approximately 90% of the acquisition time windows when only the mean-cross values $MC_{i,102}$ and the variance of the norms $Var_{i,102}$, obtained from the first sensor data 102$x$, 102$y$, 102$z$, are used. As such, even in low-power and low-cost implementations of the embodiment systems and methods a high accuracy can be achieved, even without the use of a meta-classifying circuit 112. It has also been noted that when both the mean-cross values $MC_{i,102}$ and the variance of the norms $Var_{i,102}$ (obtained from the first sensor data 102$x$, 102$y$, 102$z$) and the mean-cross values $MC_{i,108}$ and the variance of the norms $Var_{i,108}$ (obtained from the second sensor data 108$x$, 108$y$, 108$z$) are used, approximately 97% accuracy can be achieved even without the use of a meta-classifying circuit 112.

In low-power applications, the choice of which data to extract from the acquisition time window $W_i$ is based on a trade-off between accuracy and power consumption. Generally, the number of features determined by the first feature detection circuit 104 (and the second feature detection circuit 110 in embodiments that use it in conjunction with circuit 104) can be varied. For example, the mean for each axis can be computed, and this may be used to determine the mean-cross value for each axis for each acquisition time window $W_1$. As another example, the energy of the signal received from the motion sensors can be used. However, it is noted that determination of a greater number of features is accompanied by an increase in resources (e.g. memory, execution time, and power).

The output of the meta-classifying circuit 112 may be provided to a state monitor 114, which may adapt the behavior or operation of the electronic device 101. The state monitor 114 may be implemented using a controller and a memory register. The output of the classifying circuit 106 and/or the output of the meta-classifying circuit 112 may be stored in the memory register of the state monitor 114, and the controller of the state monitor 114 may be configured to read the content of the memory register. In response to a determination that the electronic device is on a stationary or stable surface (e.g. a table), the state monitor 114 may generate an interrupt signal 116 that may adapt the behavior or operation of electronic device 101, for example, fan speeds and clock frequencies of electronic components (e.g. of a central processing unit (CPU), a graphics processing unit (GPU), or a power supply unit) in the electronic device 101 may be increased to achieve better performance (e.g. faster computation times). Conversely, in response to a determination that the electronic device is not on a stationary or stable surface (e.g. when the electronic device is in motion or on a user's lap), the interrupt signal 116 may cause the clock frequencies of components in the electronic device 101 to be decreased to reduce power consumption and to avoid overheating of the components in the electronic device 101.

Figure 6A:
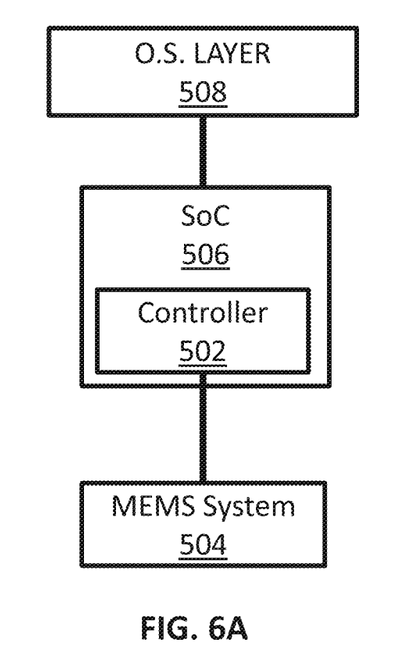
FIGS. 6A to 6C show block diagrams illustrating various ways of implementing the detection system of FIG. 1 and the method of FIG. 2, in accordance with various embodiments.

The embodiment systems and methods discussed above can be implemented in various ways. FIG. 6A shows a first example, where the method 200, as well as the classifying circuit and meta-classifying circuit 112, is implemented by a controller 502 (e.g. a microcontroller) that is coupled to a micro-electro-mechanical (MEMS) system-in-package 504. The MEMS system-in-package 504 may implement the first motion sensor 102 and/or the second motion sensor 108. Furthermore, the controller 502 may be included in a system-on-chip (SoC) 506, which is communicatively coupled to the operating system layer 508 of the electronic device 101.

Figure 6B:
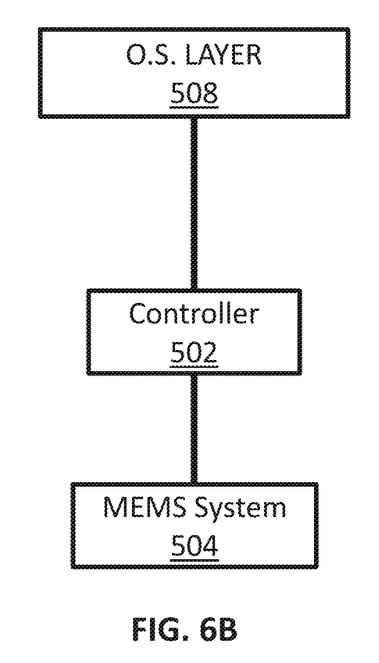

FIG. 6B shows another example, where the method 200, as well as the classifying circuit and meta-classifying circuit 112, is implemented by directly connecting the controller 502 to the operating system layer 508 (e.g. without the SoC 506 of FIG. 6A being an intervening connection).

Figure 6C:
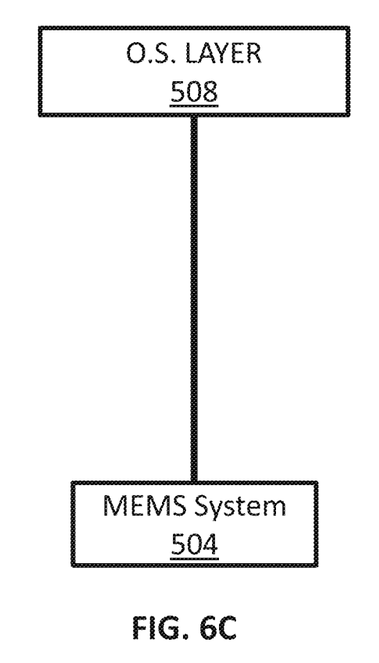

FIG. 6C shows another example, where the method 200, as well as the classifying circuit and meta-classifying circuit 112, is implemented directly in hardware (e.g. directly on the MEMS system-in-package 504, aided by software embedded in the MEMS system-in-package 504) that is connected to the operating system layer 508. It is noted that current consumption of the implementation shown in FIG. 6A is greater than current consumption of the implementation shown in FIG. 6B, which is, in turn, greater than current consumption of the implementation shown in FIG. 6C.

The embodiment systems and methods have at least the following advantages: (1) are easily tuned or reconfigured (e.g. due to the use of machine learning approach for classifying circuit 106); (2) have low latency and short convergence times (e.g. less than 10 seconds, due to the time interval TI being split into a plurality of short time windows $t_i$, each of which is about 1 second and also configurable/adjustable); (3) do not require calibration of the motion sensors (e.g. due to the use of orientation-independent features of mean-cross values and the variance of the norms, thereby exhibiting immunity against device-to-device variations, accelerometer offsets, and/or gyroscope bias); and (4) have greater reliability compared to conventional systems and methods since orientation-independent features are used in embodiment systems and methods. Furthermore, as mentioned in reference to FIG. 6C, the embodiment systems and methods may be executed directly in hardware, thus enabling ultra-low power implementations of the embodiment systems and methods.

In an embodiment, a system includes: a first motion sensor configured to generate first sensor data indicative of a first type of movement of an electronic device; a first feature detection circuit configured to determine at least one orientation-independent feature based on the first sensor data; and a classifying circuit configured to determine whether or not the electronic device is located on a stationary surface based on the at least one orientation-independent feature.

In an embodiment, a method includes: generating, by an accelerometer of an electronic device, first sensor data over an acquisition time window; generating, by a gyroscope of the electronic device, second sensor data over the acquisition time window; determining, by a first feature detection circuit, at least one first orientation-independent feature for the acquisition time window based on the first sensor data; determining, by a second feature detection circuit, at least one second orientation-independent feature for the acquisition time window based on the second sensor data; and executing, by a classification circuit, a machine learning classification to determine whether or not the electronic device is located on a stationary surface based on the at least one first orientation-independent feature and the at least one second orientation-independent feature.

In an embodiment, an electronic device includes a detection system. The detection system includes: an accelerometer configured to generate accelerometer data indicative of a first type of movement of an electronic device; a first feature detection circuit coupled to an output of the accelerometer and configured to determine at least one orientation-independent feature based on the accelerometer data; and a classifying circuit configured to determine whether or not the electronic device is located on a stationary surface based on the at least one orientation-independent feature.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The devices and processing systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An electronic device comprising:
   a first motion sensor configured to generate first motion sensor data indicative of a first type of movement of the electronic device; and
   circuitry configured to
      determine a first orientation-independent feature based on the first motion sensor data, the first orientation-independent feature comprising a mean-cross value associated with an acquisition time window of the first motion sensor, and
      determine whether or not the electronic device is located on a stationary surface based on the first orientation-independent feature.

2. The device of claim 1, wherein the first motion sensor comprises an accelerometer of the electronic device.

3. The device of claim 1, wherein the first motion sensor comprises a gyroscope of the electronic device.

4. The device of claim 1, wherein the first motion sensor data comprises a plurality of samples within the acquisition time window, wherein the circuitry is further configured to
   determine a norm of each of the plurality of samples of the first motion sensor data within the acquisition time window,
   determine, based on the norm of each of the plurality of samples of the first motion sensor data within the acquisition time window, a mean of the norm within the acquisition time window, and
   determine the mean-cross value associated with the acquisition time window, wherein the mean-cross value comprises a number of times the norm of the plurality of samples of the first motion sensor data within the acquisition time window crosses the mean of the norm within the acquisition time window.

5. The device of claim 4, wherein the circuitry is further configured to:
   determine a variance of the norm of the plurality of samples of the first motion sensor data within the acquisition time window, wherein the first orientation-independent feature further comprises the variance of the norm of the plurality of samples of the first motion sensor data within the acquisition time window.

6. The device of claim 4, wherein the acquisition time window is one of a plurality of acquisition time windows that are consecutive and non-overlapping.

7. The device of claim 6, wherein each of the plurality of acquisition time windows has a duration of 1 second.

8. The device of claim 1, further comprising:
   a second motion sensor configured to generate second motion sensor data indicative of a second type of movement of the electronic device, wherein the circuitry is further configured to
      determine a second orientation-independent feature based on the second motion sensor data, wherein the second orientation-independent feature comprises a mean-cross value associated with the acquisition time window of the second motion sensor, and
      determine whether or not the electronic device is located on the stationary surface based on the second orientation-independent feature.

9. The device of claim 1, wherein the circuitry is configured to perform a machine learning classification to determine whether or not the electronic device is located on the stationary surface.

10. The device of claim 9, wherein the circuitry is configured to perform the machine learning classification by performing a logistic regression classification, a naive Bayes classification, a support vector machine classification, a decision tree classification, a boosted tree classification, a random forest classification, a neural network classification, or a nearest neighbor classification.

11. The device of claim 1, wherein the circuitry is further configured to:
assign a label indicating that the electronic device is located or not located on the stationary surface during the acquisition time window;
determine a subsequent first orientation-independent feature associated with a subsequent acquisition time window of the first motion sensor;
assign a subsequent label indicating that the electronic device is located or not located on the stationary surface during the subsequent acquisition time window; and
determine whether or not the electronic device is located on a stationary surface based on the label and the subsequent label.

12. An electronic device comprising:
a first motion sensor configured to generate first motion sensor data indicative of a first type of movement of the electronic device;
a second motion sensor configured to generate second motion sensor data indicative of a second type of movement of the electronic device; and
circuitry configured to
determine a first orientation-independent feature based on the first motion sensor data,
determine a second orientation-independent feature based on the second motion sensor data, and
determine whether the electronic device is located on a stationary surface based on the first orientation-independent feature and the second orientation-independent feature.

13. The device of claim 12, wherein the first motion sensor data comprises a first plurality of samples within a first acquisition time window, and wherein the second motion sensor data comprises a second plurality of samples within the first acquisition time window, wherein the first orientation-independent feature comprises a variance of norms of each of the first plurality of samples, and the second orientation-independent feature comprises a variance of norms of each of the second plurality of samples.

14. The device of claim 12, wherein the first motion sensor comprises an accelerometer of the electronic device, and wherein the second motion sensor comprises a gyroscope of the electronic device.

15. The device of claim 12, wherein the circuitry is configured to perform a machine learning classification to determine whether or not the electronic device is located on the stationary surface.

16. The device of claim 12, wherein the first orientation-independent feature comprises a first mean-cross value associated with a first acquisition time window of the first motion sensor, and wherein the second orientation-independent feature comprises a second mean-cross value associated with the first acquisition time window of the second motion sensor.

17. The device of claim 16, wherein the first motion sensor data comprises a first plurality of samples within the first acquisition time window, and wherein the second motion sensor data comprises a second plurality of samples within the first acquisition time window, wherein the first mean-cross value comprises a number of times a first norm of the first plurality of samples of the first motion sensor data within the first acquisition time window crosses a first mean of the first norm within the first acquisition time window, wherein the second mean-cross value comprises a number of times a second norm of the second plurality of samples of the second motion sensor data within the first acquisition time window crosses a second mean of the second norm within the first acquisition time window.

18. An electronic device comprising:
circuitry configured to
determine a first orientation-independent feature based on a first motion sensor data from a first motion sensor measured within an acquisition time window, the first motion sensor data being indicative of a first type of movement of the electronic device, the first motion sensor data comprising a plurality of samples within a acquisition time window,
determine a norm of each of the plurality of samples of the first motion sensor data within the acquisition time window,
determine, based on the norm of each of the plurality of samples of the first motion sensor data within the acquisition time window, a metric of the norm within the acquisition time window, and
determine whether or not the electronic device is located on a stationary surface based on the metric of the norm.

19. The device of claim 18, wherein the metric comprises a mean-cross value associated with the acquisition time window, wherein the circuitry is configured to
determine, based on the norm of each of the plurality of samples of the first motion sensor data within the acquisition time window, a mean of the norm within the acquisition time window, and
determine the mean-cross value associated with the acquisition time window, wherein the mean-cross value comprises a number of times the norm of the plurality of samples of the first motion sensor data within the acquisition time window crosses the mean of the norm within the acquisition time window.

20. The device of claim 18, wherein the metric comprises a variance of the norm of the plurality of samples, wherein the circuitry is further configured to:
determine a variance of the norm of the plurality of samples of the first motion sensor data within the acquisition time window, wherein the first orientation-independent feature further comprises the variance of the norm of the plurality of samples of the first motion sensor data within the acquisition time window.

21. The device of claim 18, wherein the circuitry is further configured to:
assign a label indicating that the electronic device is located or not located on the stationary surface during the acquisition time window;
determine a subsequent first orientation-independent feature associated with a subsequent acquisition time window of the first motion sensor;
assign a subsequent label indicating that the electronic device is located or not located on the stationary surface during the subsequent acquisition time window; and
determine whether or not the electronic device is located on a stationary surface based on the label and the subsequent label.

* * * * *